US011244079B2

United States Patent
Cocchini et al.

(10) Patent No.: US 11,244,079 B2
(45) Date of Patent: Feb. 8, 2022

(54) DATA DETECTION MITIGATION IN PRINTED CIRCUIT BOARDS

(71) Applicant: International Business Machines Corporation, Armonk, NY (US)

(72) Inventors: Matteo Cocchini, Long Island City, NY (US); Silvio Dragone, Olten (CH); Stefano Sergio Oggioni, Milan (IT); James Busby, New Paltz, NY (US); William Santiago-Fernandez, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 16/574,822

(22) Filed: Sep. 18, 2019

(65) Prior Publication Data
US 2021/0081576 A1    Mar. 18, 2021

(51) Int. Cl.
*H04L 9/06* (2006.01)
*G06F 21/75* (2013.01)
*H05K 1/02* (2006.01)

(52) U.S. Cl.
CPC .......... *G06F 21/755* (2017.08); *H04L 9/0656* (2013.01); *H05K 1/0275* (2013.01)

(58) Field of Classification Search
CPC . G06F 21/755; H04L 9/0656; H04L 2209/04; H04L 2209/12; H04L 9/001; H05K 1/0275; H05K 2201/09309; H05K 2201/10204; H05K 2201/09972; H05K 1/0216
See application file for complete search history.

(56) References Cited

U.S. PATENT DOCUMENTS

| | | | |
|---|---|---|---|
| 5,793,259 A | 8/1998 | Chengson | |
| 7,598,747 B2 | 10/2009 | Motohashi et al. | |
| 7,639,993 B1 | 12/2009 | Shumarayev et al. | |
| 7,773,390 B2 | 8/2010 | Weir et al. | |
| 7,886,431 B2 | 2/2011 | Weir et al. | |
| 8,862,453 B2 | 10/2014 | Hollis | |
| 8,930,428 B2 | 1/2015 | Yasuda et al. | |
| 9,306,969 B2 | 4/2016 | Dagon et al. | |
| 9,531,916 B2 | 12/2016 | Janus et al. | |
| 10,146,935 B1 | 12/2018 | Patel et al. | |
| 2003/0169121 A1* | 9/2003 | Grebenkemper | .... H05K 1/0234 333/12 |

(Continued)

FOREIGN PATENT DOCUMENTS

| | | |
|---|---|---|
| EP | 2987165 B1 | 10/2018 |
| JP | 2006234803 A | 9/2006 |

OTHER PUBLICATIONS

Giechaskiel et al., "Taxonomy and Challenges of Out-of-Band Signal Injection Attacks and Defenses", ARXIV 2019, pp. 1-20.

*Primary Examiner* — Baotran N To
(74) *Attorney, Agent, or Firm* — Robert J. Shatto

(57) ABSTRACT

Provided is a method for masking a sensitive signal by injecting noise into planes of a printed circuit board (PCB). The method comprises detecting, by a secondary integrated circuit (IC), a noise signal on a shared plane of a PCB that includes the secondary IC. The noise signal may be analyzed to determine the characteristics of the noise signal. A masking signal may be generated based on the characteristics. The masking signal may then be injected onto the shared plane.

20 Claims, 10 Drawing Sheets

(56) References Cited

U.S. PATENT DOCUMENTS

| | | | |
|---|---|---|---|
| 2004/0145425 A1* | 7/2004 | Grebenkemper | H05K 1/167 |
| | | | 333/12 |
| 2006/0181287 A1* | 8/2006 | Motohashi | G01R 31/002 |
| | | | 324/613 |
| 2007/0178760 A1* | 8/2007 | Motohashi | G01R 31/2841 |
| | | | 439/579 |
| 2011/0068878 A1 | 3/2011 | Weir et al. | |
| 2011/0102075 A1 | 5/2011 | Weir et al. | |
| 2011/0267190 A1 | 11/2011 | Payson et al. | |
| 2014/0361787 A1 | 12/2014 | Paoletti | |

\* cited by examiner

DATA DETECTION MITIGATION IN PRINTED CIRCUIT BOARDS

BACKGROUND

The present disclosure relates generally to the field of integrated circuits, and more particularly to injecting noise in a printed circuit board to mask sensitive signals generated by ICs.

Printed circuit boards (PCBs) mechanically support, and electrically connect, a plurality of electronic components, including integrated circuits (ICs). Power is often provided to the electronic components using a set of planes, such as a power plane that carries a voltage and a reference, or ground, plane. The electronic components connect to these planes using a series of vias and traces.

SUMMARY

Embodiments of the present disclosure include a method, computer program product, and system for masking a sensitive signal by injecting noise into planes of a printed circuit board (PCB). The method comprises detecting, by a secondary integrated circuit (IC), a noise signal on a shared plane of a PCB that includes the secondary IC. The noise signal may be analyzed to determine the characteristics of the noise signal. A masking signal may be generated based on the characteristics. The masking signal may then be injected onto the shared plane.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
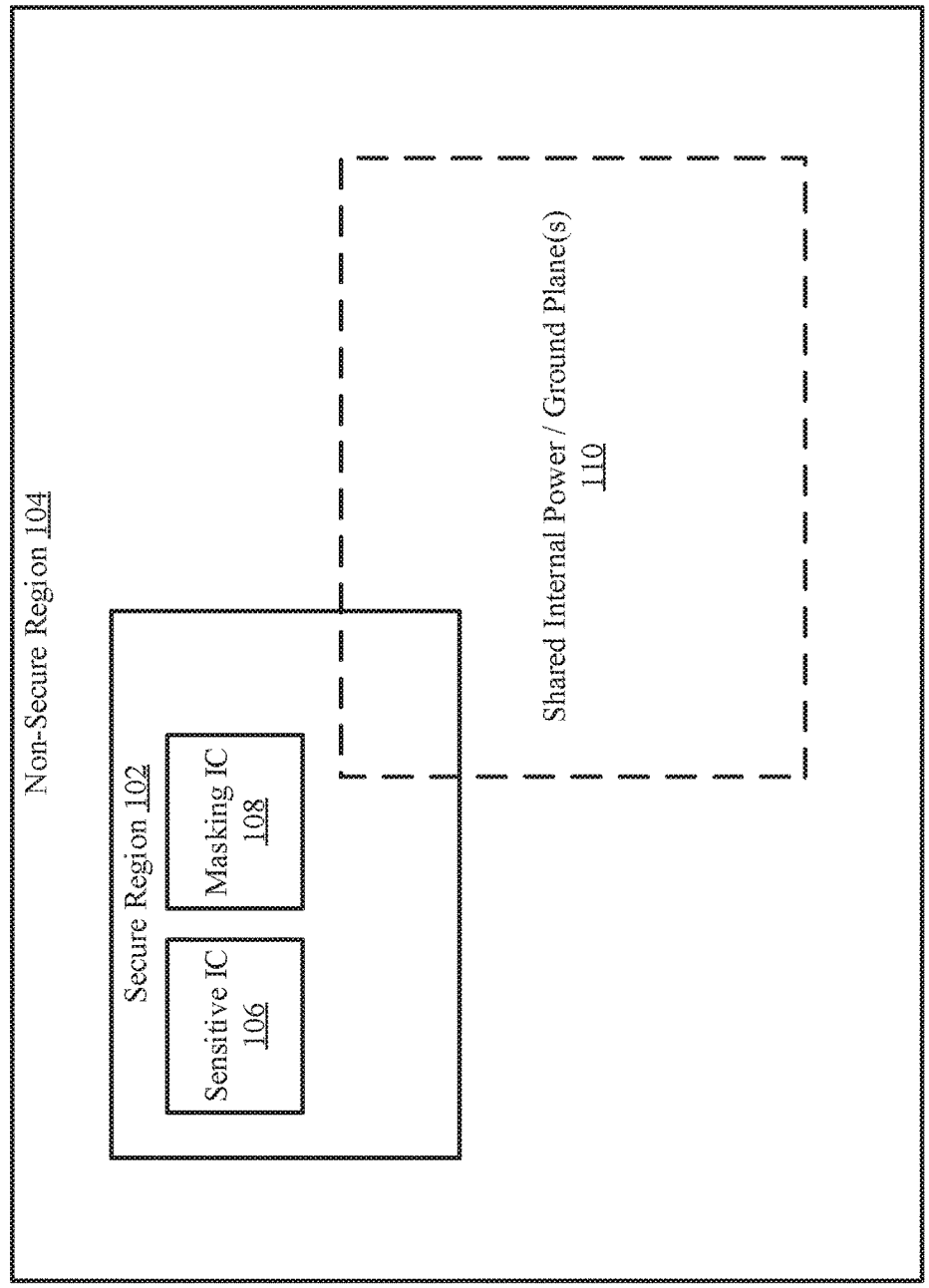
FIG. 1 illustrates a block diagram of an example printed circuit board with a masking integrated circuit (IC) for masking a bit pattern generated by a sensitive IC, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of integrated circuits (ICs), and in particular to injecting noise in a printed circuit board (PCB) to mask sensitive signals generated by ICs While the present disclosure is not necessarily limited to such applications, various aspects of the disclosure may be appreciated through a discussion of various examples using this context.

Signal switching activity on ICs could be coupled into the power planes through via transitions or other coupling mechanisms. This can lead to signal features being potentially observable by monitoring power and reference (commonly ground) planes. Usually, the signal coupling is strongly attenuated at the power plane levels, but it could be still visible. In particular, signal features including the frequency, rise time, variations in amplitude and bit patterns (extremely important) may be detectable by monitoring the power planes.

If the bit pattern contains sensitive data (e.g., encryption keys), that data could be unintentionally exposed, even radiating, from the PCB. Even if high security regions are defined to protect the sensitive signals, the power and the ground plan can allow the signals (or noise generated by the signals) to propagate outside those boundaries into unsecure regions, allowing devices to monitor and potentially capture the sensitive data.

In accordance with some embodiments of the present disclosure, a secondary IC is added to the PCB to generate a noise pattern similar to the original IC (also referred to herein as the sensitive IC). In some embodiments, the secondary IC is a separate IC on a separate chip (also referred to herein as the masking IC). In these embodiments, the secondary IC can be in either the secure region or the unsecure region of the PCB. In some embodiments, the secondary IC is circuitry added to the original, sensitive IC and, accordingly, is on the same chip. In some embodiments, the power/ground pins of the secondary IC (or circuitry on the same IC) is placed as close as possible to the primary sensitive IC. This is to make the two signals more similar at a far observation point. The voltages from the original source (e.g., the noise generated by the first IC) and the fictitious pattern generated by the secondary IC overlap at the observation point for the superposition of effects, thereby obscuring the data and making it more complicated, potentially impossible, for an attacker to recover the original data.

In order to increase the difficulty of separating the noise created by the sensitive IC (referred to herein as the sensitive signal) from the noise created by the secondary IC, the secondary IC may be configured to generate a signal (referred to herein as the masking signal) that is similar to the sensitive signal. Specifically, the masking signal may have the same frequency, amplitude, and rise and fall time as the sensitive signal. The bit pattern, however, may be a random (or pseudo-random) pattern such that when it superposes with the sensitive signal (or when the noises generated by the signals superimpose), it creates a random, indecipherable pattern that obscures the sensitive signal. The secondary IC may be configured and wired similar to the sensitive IC to increase the similarity between the noise signal and the masking signal, further increasing the difficulty in separating the two signals. Similarly, the secondary IC may be placed close to the sensitive IC (e.g., as close as possible) to increase the similarity between the signals.

Different implementations of this concept are disclosed herein, and these implementations can be applied individually or in combination with each other. In embodiments of a first implementation, the secondary IC reads the voltage levels (e.g., the noise signal) on the shared power and/or ground planes, analyzes the noise signal, generates a masking signal based on the analysis, and injects the masking signal onto the power/ground plane(s). In embodiments of a second implementation, the secondary IC is configured and wired such that it mimics the original signal, but it has a randomized bit pattern. Embodiments of the first implementation are shown and described in more detail in reference to FIGS. 4-6, and embodiments of the second implementation are shown and described in more detail in reference to FIGS. 7 and 8.

In some embodiments, differential signaling is used in conjunction with the secondary IC to make the sensitive signal less detectable on the power/reference planes. Differential signaling involves utilizing two signals (referred to as legs) to transmit data from a source to a receiver. The data sequence is transmitted identically in both legs of the pair, but the polarity is opposite. At the receiver, the two leg signals are subtracted so any identical noise on the two legs will be canceled. However, this is true only if the layout of the traces is perfectly matched. In reality, there will be differences on the two legs (proximity of plane edges, vias nearby, mismatch, etc.), and these differences lead to common mode radiation. That common mode radiation is still observable on the power planes in the form of noise, and it could reveal info about the original pattern.

Either (or both) of the two previously discussed implementations can be applied to a sensitive IC that uses differential signaling. With the first implementation, no additional wiring is necessary when dealing with ICs configured to utilize differential signaling. This is because the secondary IC already includes a detector to analyze the noise on the power/ground planes. Using the detector, the secondary IC will generate a signal that mimics the common mode noise that it detects on the planes. With the second implementation, two additional differential wires are required. The additional wires are routed similarly to the sensitive signal, but with a different pattern.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 illustrates a block diagram of an example printed circuit board (PCB) 100 with a masking integrated circuit (IC) 108 for masking a bit pattern generated by a sensitive IC 106, in accordance with embodiments of the present disclosure. The PCB 100 includes a secure region 102 and a non-secure region 104. The secure region 102 is an isolated region of the PCB 100 for high-security chips (e.g., chips that contain or process sensitive data, such as the sensitive IC 106). In some embodiments, the secure region 102 further includes the masking IC 108. The non-secure region 104 contains other ICs and chips, which are not shown.

As shown in FIG. 1, the secure region 102 and non-secure region 104 may have shared internal power and/or reference (e.g., ground) planes 100. The power plane is a plane that carries the voltage of the system and provides power to the different components on the PCB 100, whereas the ground plane a large area (e.g., often made of copper foil) on the PCB 100 which is connected to the power supply ground terminal and serves as a return path for current from the components on the board. The components of the PCB, including the sensitive IC 106 and the masking IC 108, may be connected to the power and ground planes 110 using traces and vias.

PCBs 100 that include secure region(s) 102 may nevertheless rely on common power and ground planes 110 in order to save costs and reduce the complexity required to have separate power/ground planes 110 for the secure ICs. A drawback of this is that the signals generated by the sensitive IC 106 may leak onto the power/ground planes 110 in the form of noise. While typically highly attenuated, this noise may be detectable by circuits or probes in the non-secure region 104, or anywhere else with a connection to the power/ground planes 110 (e.g., using a voltage probe connected to a via), and can be converted back into the original, sensitive signal, allowing an attacker to read the sensitive data processed/generated by the sensitive IC.

In order to obfuscate and protect the sensitive signal, in embodiments of the present disclosure, the PCB includes a masking IC 108. As discussed herein, the masking IC 108 may be configured to inject additional noise onto the power/ground planes 110. This additional noise combines with the noise already on the power/ground planes 110 though superposition, resulting in a detectable signal on the power/ground planes that is effectively randomized. Furthermore, because the masking IC 108 closely mimics the sensitive IC 106 (e.g., creates a signal with similar characteristics as the noise signal) and is in the secure region 102, it can be extremely difficult to separate the noise from the sensitive IC 106 from the noise intentionally generated by the masking IC 108. This makes it difficult, if not impossible, to analyze the resulting signal to steal the sensitive data by determining the original, sensitive signal produced by the sensitive IC 106.

Figure 2:
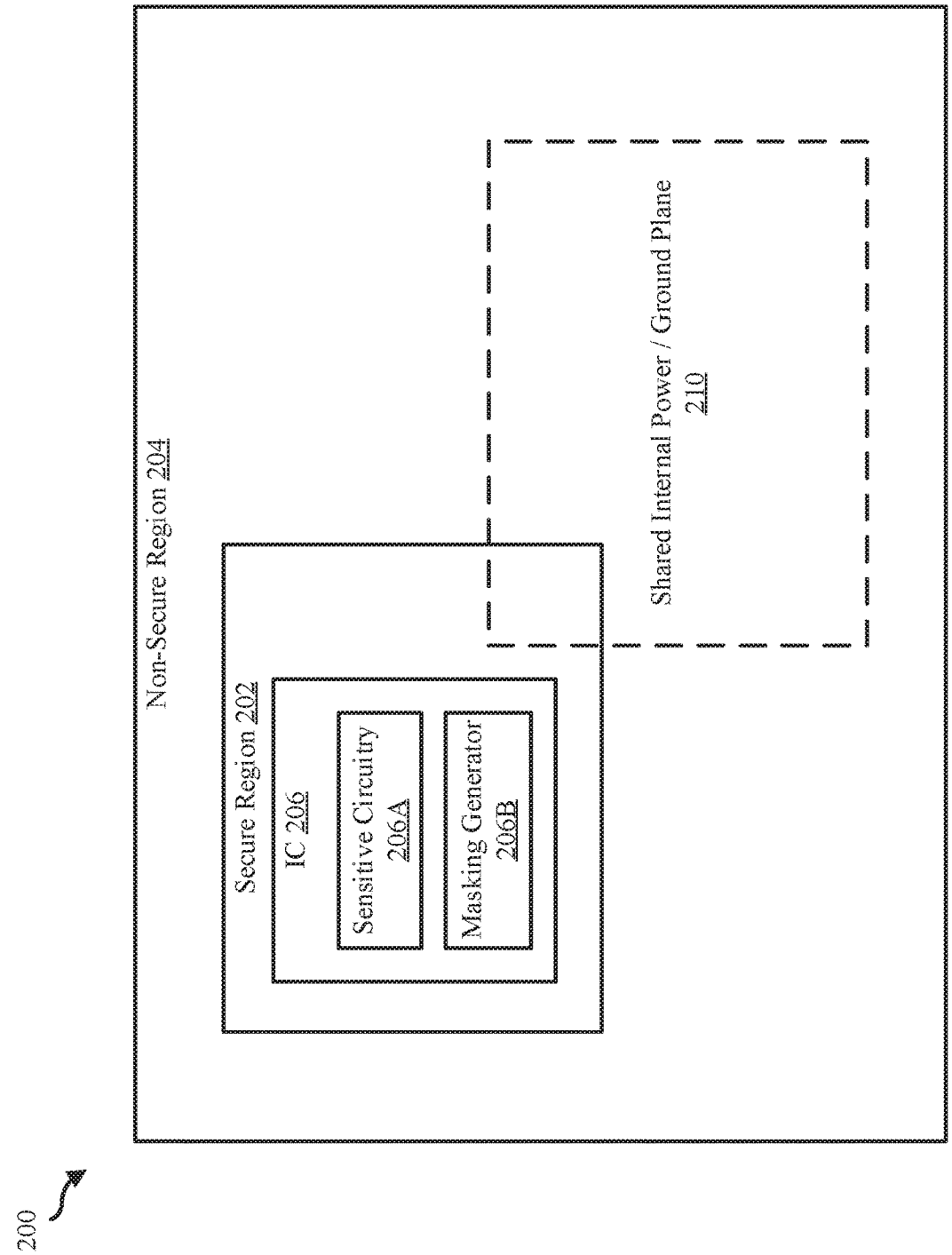
FIG. 2 illustrates a block diagram of an example printed circuit board with an IC that includes masking circuitry for masking a bit pattern generated by the IC, in accordance with embodiments of the present disclosure.

Referring now to FIG. 2, illustrated is a block diagram of an example PCB 200 with an IC 206 that includes masking circuitry 206B for masking a bit pattern generated by the IC (e.g., by the sensitive circuitry 206A), in accordance with embodiments of the present disclosure. As with the PCB 100 shown and described in FIG. 1, the PCB 200 includes a secure region 202 and a non-secure region 204. In some embodiments, the IC 206 includes at least two sets of circuitry: sensitive circuitry 206A that generates and/or processes sensitive data and masking generator 206B. The non-secure region 204 contains other ICs and chips, which are not shown.

In some embodiments, the PCB 200, secure region 202, non-secure region 204, and shared power/ground planes 210 may be the same as, or substantially similar to, the PCB 100, secure region 102, non-secure region 104, and shared power/ground planes 110, respectively, as shown and discussed in reference to FIG. 1. Unlike FIG. 1, where the sensitive IC 106 and masking IC 108 were separate chips, FIG. 2 illustrates an embodiment in which the masking is performed by circuitry 206B on the same chip (e.g., IC 206) as the sensitive circuitry 206A (e.g., the circuitry that generates the sensitive signal). The masking circuitry 206B performs all of the same functions as the masking IC 108, including the generation and injection of noise onto the shared power/ground planes 210. The use of a single IC with masking circuitry 206B, as illustrated in FIG. 2, may be electrically preferable because of the proximity between the sensitive and masking circuits' pins.

Figure 3:
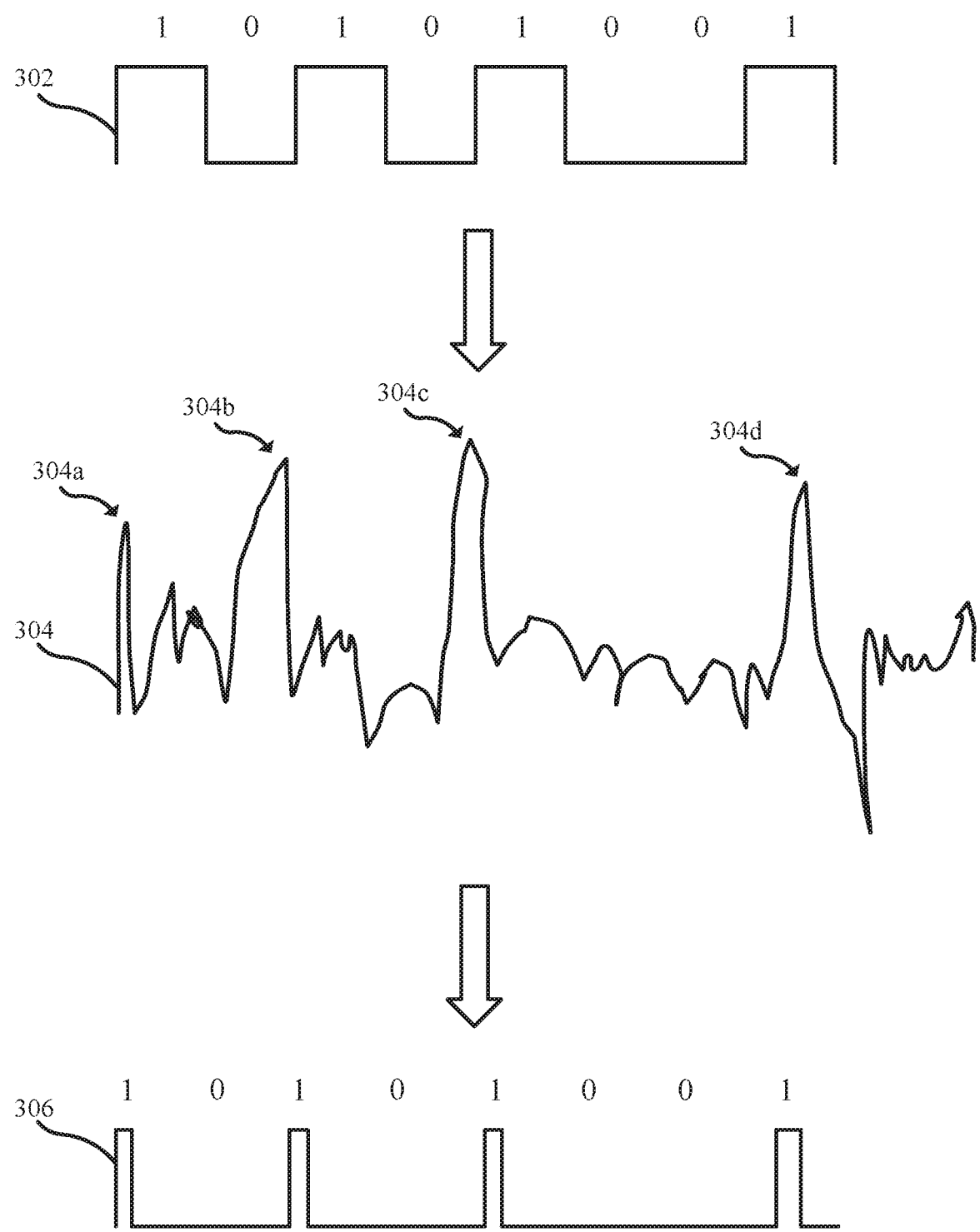
FIG. 3 illustrates how noise generated by IC switching can be analyzed to determine a bit pattern of the IC, in accordance with embodiments of the present disclosure.

Referring now to FIG. 3, illustrated is a diagram showing how noise 304 generated by IC switching can be analyzed to determine a bit pattern (e.g., the data) of the IC, in accordance with embodiments of the present disclosure. The noise shown in FIG. 3 is an illustrative example of noise 304 that may be generated according to a particular bit pattern, though in practice the actual noise pattern would depend on numerous factors, and the example shown in FIG. 3 is not to be considered a limiting example. As shown in FIG. 3, the sensitive IC is switching according to the bit pattern 10101001 (e.g., associated with sensitive data, such as encryption keys), resulting in the square wave 302. This switching creates noise 304 on the power and/or ground planes. It should be understood that the noise 304 shown in FIG. 3 would have an amplitude that is much smaller than the signal voltage on the plane, but would nevertheless have a discernable pattern as shown.

An attacker analyzing the noise 304 would be able to identify four distinct peaks 304a-d. By performing signal analysis (e.g., Fourier filtering) on the noise signal 304, and specifically by isolating the peaks 304a-d and determining a relative location of the peaks 304a-d in a time-domain, the attacker could determine that the bit pattern is 10101001. For example, the attacker may look solely at the peaks of the noise signal 304, which is represented for the purpose of illustration by new square wave 306. The new square wave 306 may have a different amplitude and different widths than the sensitive signal 302; however, analysis of the characteristics of the new square wave 306 may allow the attacker to determine that the bit pattern of the sensitive IC is 10101001, as shown in FIG. 3.

Figure 4:
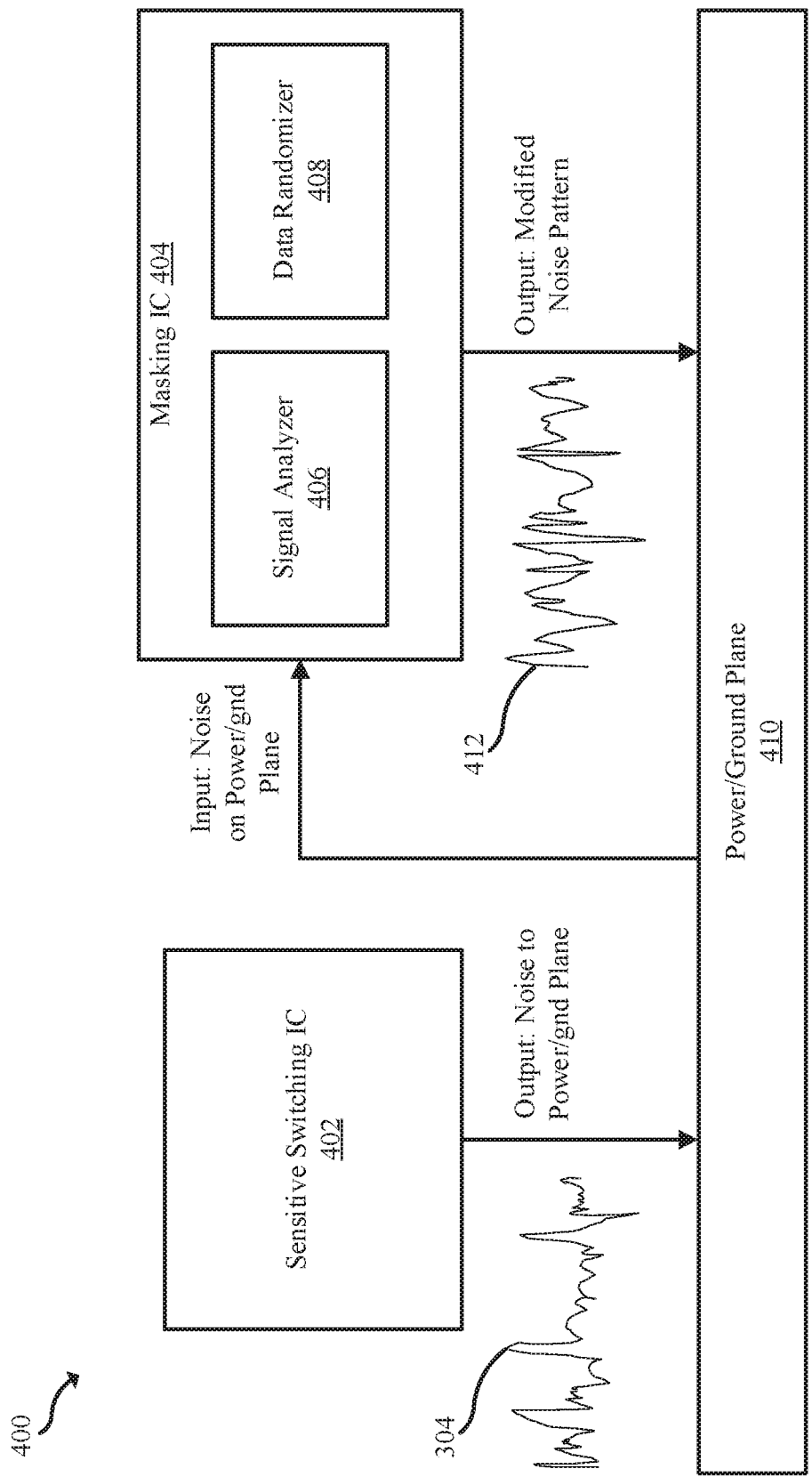
FIG. 4 illustrates a block diagram of a system that utilizes signal processing and a data randomizer to generate noise to mask a bit pattern, in accordance with embodiments of the present disclosure.

Referring now to FIG. 4, illustrated is a block diagram of a system 400 that utilizes signal processing and a data randomizer to generate noise to mask a bit pattern, in accordance with embodiments of the present disclosure. Because the system 400 actively monitors the noise on the power/ground plane 410, it is illustrative of embodiments of the first implementation disclosed herein.

The system 400 includes a sensitive IC 402 and a masking IC 404. The sensitive IC 402 and masking IC 404 are coupled to power and/or ground plane(s) 410 through one or more traces and vias. As discussed herein, the sensitive IC 402 and the masking IC 404 may be located in a secure region of a PCB. Despite being located in a secure region, however, the sensitive IC 402 may generate noise 304 on the power/ground plane 410. The noise 304 may be generated due to IC switching, and it may be transmitted through traces and vias onto the power/ground plane 410.

A secondary IC, referred to in FIG. 4 as the masking IC 404, may have a probe (e.g., a voltage sensor) connected to the power/ground plane 410 to listen for noise on the power/ground plan 410. The detected noise may act as an input for the masking IC 404. The masking IC 404 analyzes the noise signal 304 using a signal analyzer 406 to identify its spectral components (e.g., frequencies). The secondary IC may also identify the amplitudes and rise/fall times of the noise signal 304.

The signal analyzer 406 may perform one or more signal processing techniques to determine the characteristics of the noise signal 304 (e.g., the spectral components, amplitudes, and rise/fall times). For example, the signal analyzer 406 may be a spectrum analyzer that measures the magnitude of the noise signal against its frequency. In some embodiments, the signal analyzer 406 may perform a Fourier transform process on the noise signal 304 to decompose the noise signal 304 into its constituent frequencies. The signal processing techniques disclosed herein are illustrative examples of techniques that may be used, and the present disclosure should not be limited to the specific examples described herein. As would be recognized by one of ordinary skill, other signal processing techniques may be used in addition to, or instead of, those disclosed herein.

The masking IC 404 may then generate a masking signal 412 (e.g., a noise voltage) based on the characteristics of the read signal. The generated masking signal 412 may have identical, or nearly identical, frequency, amplitude, and rise/fall times as the noise signal 304 on the power/ground planes, but the bit pattern of the masking signal 412 may be random. In other words, the noise from the masking signal 412 will have similar spectral components compared to the noise signal 304 created by the original, sensitive data processed by the sensitive IC, but the amplitudes will be shifted randomly to create peaks in different areas of the time-domain signal. The masking signal 412 may be randomized using a data randomizer 408, which may create a random, or pseudo-random, bit pattern which is then converted into a modified noise pattern (e.g., the masking signal 412) by the masking IC 404. The masking IC 404 may inject the masking signal 412 directly to the power and/or ground planes 410 to replicate (e.g., mimic) the noise 304 it observes. The masking IC 404 may inject the signal 412 using traces and vias. The resulting signal on the power and/or ground planes 410 will be a combination of the noise signal 304 and the masking signal 412, through superposition, and will therefore be effectively random and difficult, or impossible, to retrieve the sensitive data from. In some embodiments, the number and placement of the traces and vias connecting the masking IC 404 to the power and ground planes 410 may approximate the number and placement of vias in the sensitive IC 402, thereby making the signals more similar and difficult to separate.

Because embodiments enacting the first implementation, such as the illustrative embodiment shown in FIG. 4, require circuitry to read and analyze a signal already on the power/ground plane(s) 410, the circuitry of the secondary IC (e.g., masking IC 404) may be more complex than with the second implementation. Additionally, the secondary IC may be larger, requiring more area on the PCB and additional power. However, embodiments of the first implementation advantageously do not require that the designer know the details of the sensitive data (e.g., the amplitude and frequency of the switching, sensitive IC). These details can be determined through analysis of noise on the power/ground planes. Also, these embodiments can take into account, and adjust for, variations in the original signal spectrum, amplitude, rise time, etc., regardless of whether these variations were expected or not.

While the masking IC 404 is shown as separate and distinct from the sensitive IC 402, in some embodiments they may be part of the same larger IC or chip.

Figure 5:
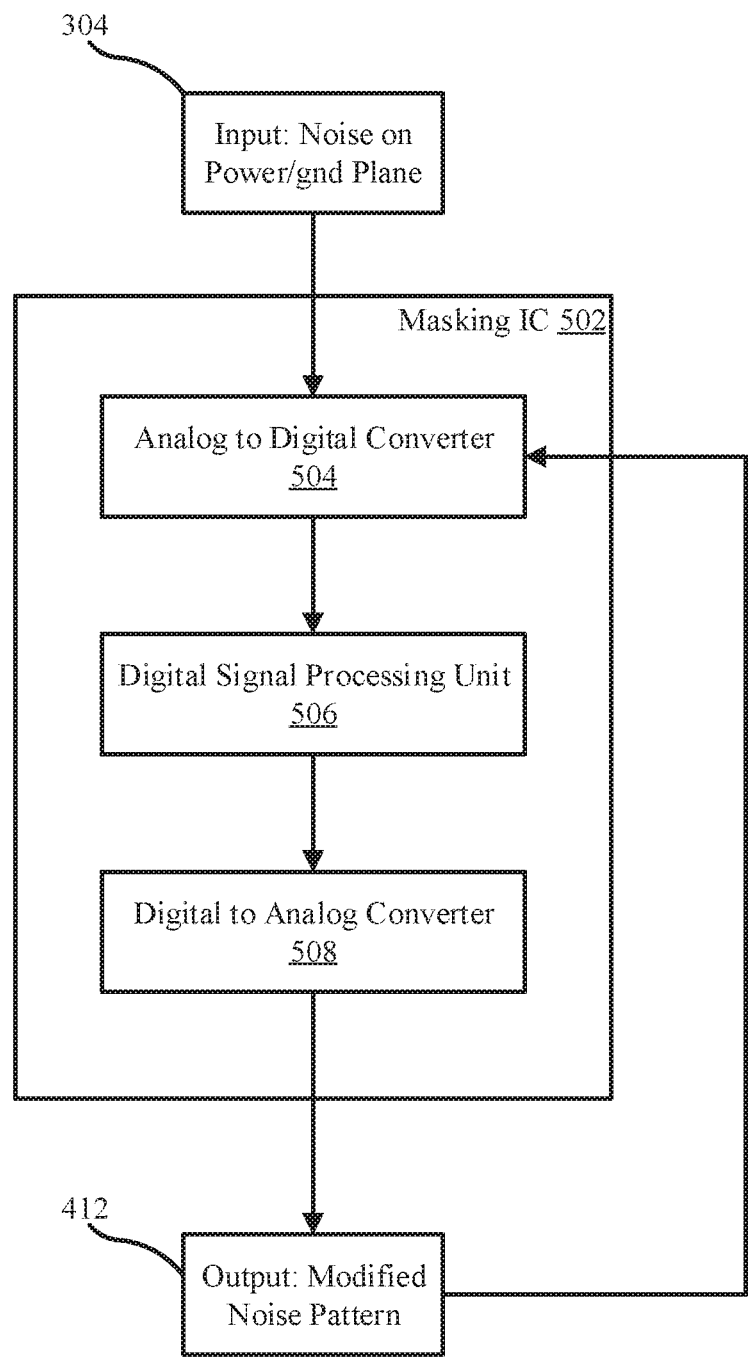
FIG. 5 illustrates a block diagram of a masking IC, in accordance with embodiments of the present disclosure.

Referring now to FIG. 5, illustrated is a block diagram of a masking IC 502, in accordance with embodiments of the present disclosure. In some embodiments, the masking IC 502 may be the same as, or substantially similar to, the masking IC 404 in FIG. 4. As discussed herein, the masking IC 502 may be configured to analyze a noise pattern created by a sensitive IC (e.g., noise signal 304) on the power/ground plane and output a modified noise pattern (e.g., a masking pattern 412) that distorts the noise signal such that an attacker cannot determine a bit pattern of the sensitive IC.

The masking IC 502 includes an analog to digital converter (ADC) 504, a digital signal processing (DSP) unit 506, and a digital to analog converter (DAC) 508. The ADC 504 is configured to receive, as its input, the signal on the power and/or ground plane(s) (e.g., a noise signal), and convert the received signal, which is an analog signal, into a corresponding digital signal, which is then passed to the DSP unit 506. Similarly, the DAC is configured to receive a digital signal from the DSP unit 506 (e.g., a digital masking signal), convert the digital signal into a corresponding analog signal, and inject the analog signal onto the power and/or ground plane(s) through one or more vias.

The DSP unit 506 is configured to receive a digital signal (e.g., a digital signal that correspond to the noise signal 304) from the ADC 504 and analyze the digital signal. The DSP unit 506 looks for each harmonic in the noise in real time, including new harmonics. For example, the DSP may perform a Fourier transform on the acquired signal in order to determine the harmonics. The DSP unit 506 uses the identified harmonics to generate a masking signal. For example, for each harmonic identified, the DSP unit 506 may be configured to create a new signal (e.g., the masking signal). The new signal has the same, or substantially similar, frequency as the harmonic. However, the signal spectrum for the new signal will be different than the original harmonic. For example, the new signal will have a different amplitude and different distribution (e.g., different variance and additional secondary harmonics).

The new noise signal (e.g., masking signal) will be injected to the plane(s) through an output pin. Due to superposition of signals, this modifies the noise signal on the ground/power planes, making it difficult, or impossible, to determine the original (sensitive) signal. In some embodiments, the DSP unit 506 will continuously readjust the spectrum of the noise in real time based on random seeds.

Figure 6:
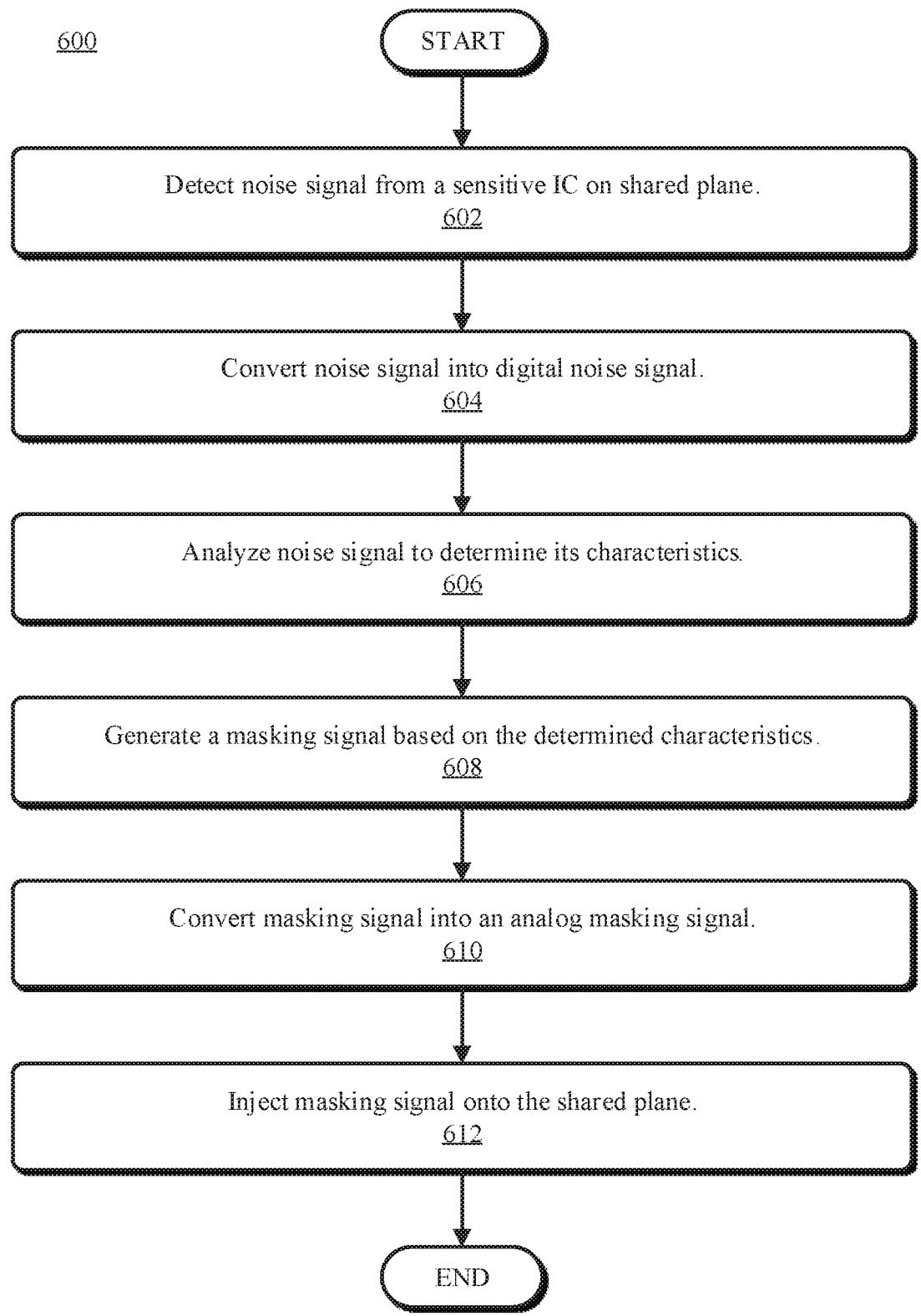
FIG. 6 illustrates a flowchart of an example method for masking a bit pattern using noise, in accordance with embodiments of the present disclosure.

Referring now to FIG. 6, illustrated is a flowchart of an example method 600 for masking a bit pattern using noise, in accordance with embodiments of the present disclosure. The method 600 may be performed by hardware, firmware, software executing on a processor (e.g., a digital signal processor), or any combination thereof. The method 600 may begin at operation 602, wherein noise generated from one or more sensitive ICs is detected on a shared plane.

As described herein, the secondary IC (e.g., a masking IC) may be a separate IC, or it may be integrated into the same chip as the sensitive IC(s). The secondary IC may detect the noise by measuring the voltage of a shared plane (e.g., a shared power plane or a shared ground plane) in the time-domain. The secondary IC may detect the noise using a voltage probe or sensor that is electrically coupled to the shared plane. For example, the secondary IC may be connected to the shared plane through one or more vias, and a voltage on one of the vias may be measured.

At operation 604, the measured noise signal may be converted into a digital noise signal. This may be performed using an analog to digital converter in the secondary IC. After converting the noise signal into a digital signal, the secondary IC may analyze the noise signal to determine its characteristics at operation 606.

The characteristics of the noise signal may include, without limitation, the spectral components (e.g., frequencies) of the noise signal, amplitudes of the noise signal (e.g., at different frequencies), and rise/fall times. The secondary IC may include a digital signal processor configured to perform spectrum analysis (e.g., a Fourier transform) on the received noise signal to determine the characteristics of the noise signal.

At operation 608, the secondary IC may generate a masking signal based on the determined characteristics. The masking signal may mimic the measured noise signal, but it may include a different bit pattern. In other words, the masking signal may have identical, or substantially similar, harmonics, rise/fall times, and amplitudes. However, the bit pattern embodied by the masking signal may be random.

At operation 610, the masking signal may be converted into an analog signal. This may be done by a digital to analog converter in the secondary IC. The analog masking signal may then be injected onto the shared plane at operation 612, using one or more vias and/or output pins, and the method 600 may end.

Figure 7:
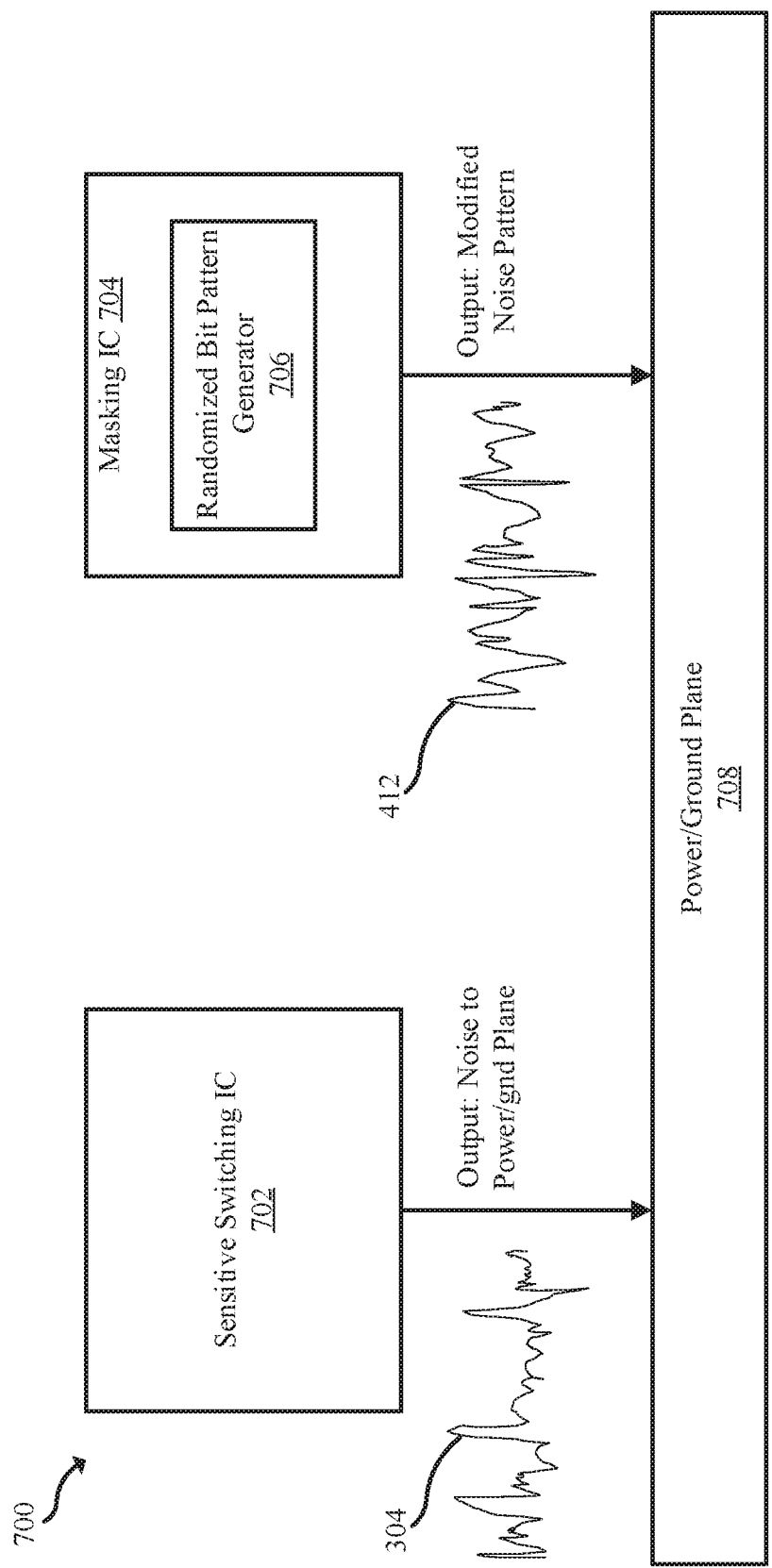
FIG. 7 illustrates a block diagram of a system that utilizes a pseudorandom pattern generator to generate noise to mask a bit pattern, in accordance with embodiments of the present disclosure.

Referring now to FIG. 7, illustrated is a block diagram of a system 700 that utilizes a pseudorandom pattern generator to generate noise to mask a bit pattern, in accordance with embodiments of the present disclosure. Because the system 700 does not actively monitor the noise on the power/ground plane 708, it is illustrative of embodiments of the second implementation disclosed herein.

The system 700 includes a sensitive IC 702 and a masking IC 704. The sensitive IC 702 and masking IC 704 are coupled to power and/or ground plane(s) 708 through one or more traces and vias. As discussed herein, the sensitive IC 702 and masking IC 704 may be located in a secure region of a PCB. Despite being located in a secure region, however, the sensitive IC 702 may generate noise 304 on the power/ground plane 708. The noise 304 may be generated due to IC switching, and it may be transmitted through the traces and vias onto the power/ground plane 708.

The masking IC 704 includes a randomized bit pattern generator 706. The randomized bit pattern generator 706 is configured to generate a random, or pseudo-random, bit pattern. The random bit pattern can then be used to generate an output signal (e.g., masking signal 412) that has similar characteristics to the noise signal 304, except for the random bit pattern.

In some embodiments, the masking signal(s) 412 are wired out of the masking IC 704 and terminated to a resistor to gnd. The expected impedance of the traces in the masking IC is configured to minimize mismatch with the sensitive IC 702, and to mimic the original, sensitive signal. In some embodiments, the masking IC 704 is wired using vias that perforate the power and ground planes 708 the same number of times that the sensitive IC 702 does. This makes the coupling similar, which reduces the likelihood that an attacker could separate the masking signal 412 from the sensitive signal noise 304. The sensitive IC 702 and masking IC 704 also need to be synchronized; otherwise, the two patterns (i.e., the sensitive signal 304 and masking signal 412) could be distinguished based on their phase.

Because embodiments of the second implementation, such as the illustrative embodiment shown in FIG. 7, do not include circuitry that can analyze the signal on the power/ground planes, designers need to have a very good knowledge of the sensitive signal and its layout. However, embodiments of the second implementation may advantageously require a relatively simple circuit implementation (e.g., it is just a randomized bit pattern generator). This takes up less space on the PCB, and draws less power, than embodiments using the first implementation. Accordingly, embodiments of the second implementation are particularly well suited to being integrated directly into the same chip as the sensitive IC (e.g., as shown in FIG. 2). Furthermore, like the first implementation, embodiments of the second implementation are better than just using differentially signally for common mode suppression.

Figure 8:
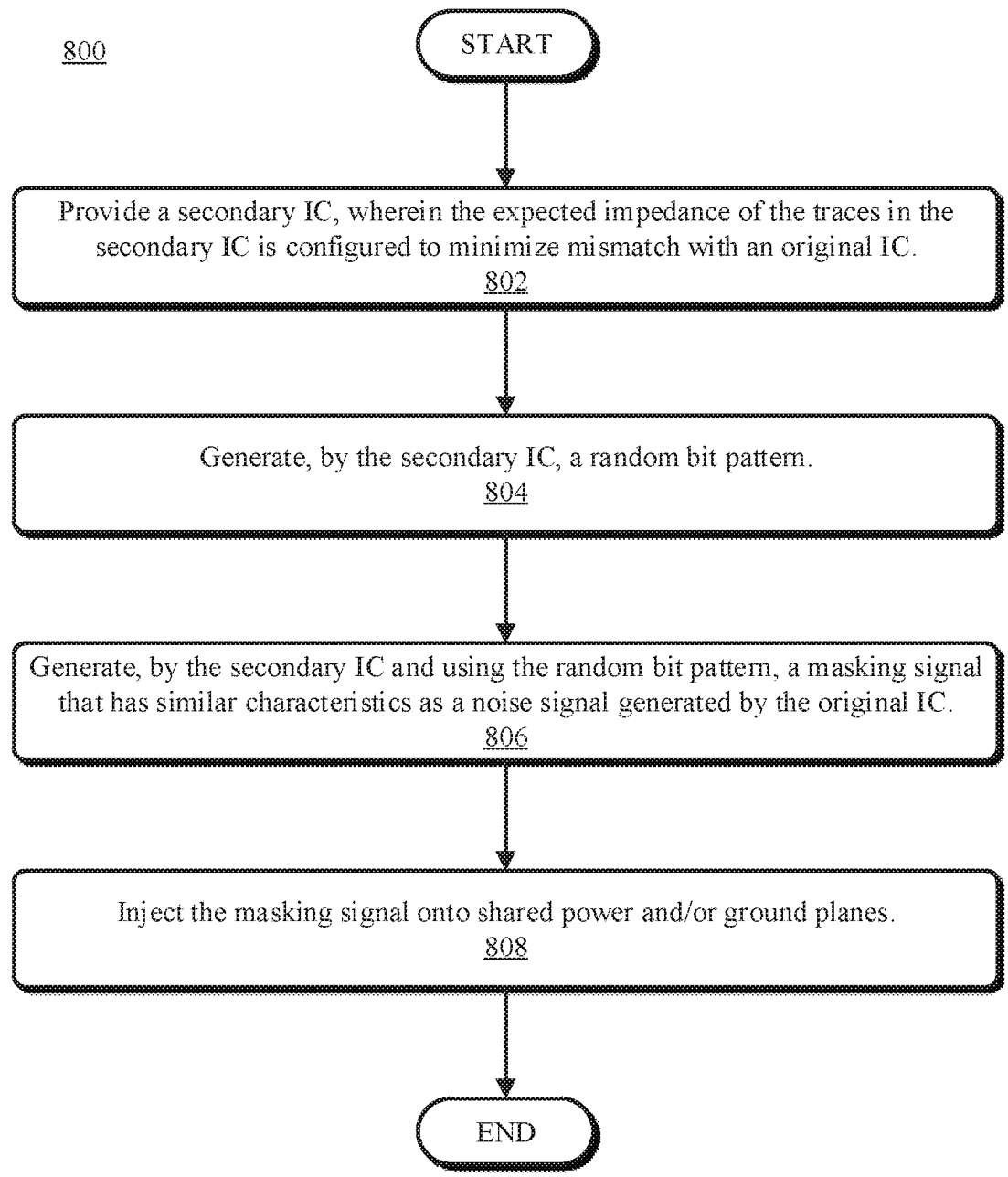
FIG. 8 illustrates a flowchart of a second example method for masking a bit pattern using noise, in accordance with embodiments of the present disclosure.

Referring now to FIG. 8, illustrated is a flowchart of a second example method 800 for masking a bit pattern using noise, in accordance with embodiments of the present disclosure. The method 800 may be performed, at least in part, by hardware (e.g., ICs) on a PCB. The method 800 may begin at operation 802, wherein a secondary IC is provided.

The secondary IC may be incorporated into a PCB that includes an original IC (e.g., a sensitive IC) that produces a signal to be masked. The secondary IC may be designed and fabricated such that signals generated by the secondary IC substantially match the signals generated by the original IC. For example, the expected impedance of the traces in the secondary IC may be configured to minimize mismatch with the original IC.

At operation 804, the secondary IC may generate a random bit pattern. This may be done using a random number generator or other circuit embodied within the secondary IC. At operation 806, the secondary IC may use the random bit pattern to generate a masking signal. The masking signal may have similar characteristics as the expected noise signal generated by the original IC. For example, the secondary IC may be configured to generate a masking signal with the same frequency, rise/fall time, and amplitude(s) as the expected noise signal from the original IC. The expected noise signal from the original IC may be determined through real-world testing and/or circuit simulation.

At operation 808, the secondary IC may inject the masking signal onto the shared planes. For example, if the secondary IC and the original IC share a common power plane and a common ground plane, the masking signal may be injected onto the power and ground planes. After injecting the masking signal on the shared planes, the method 800 may end.

Figure 9:
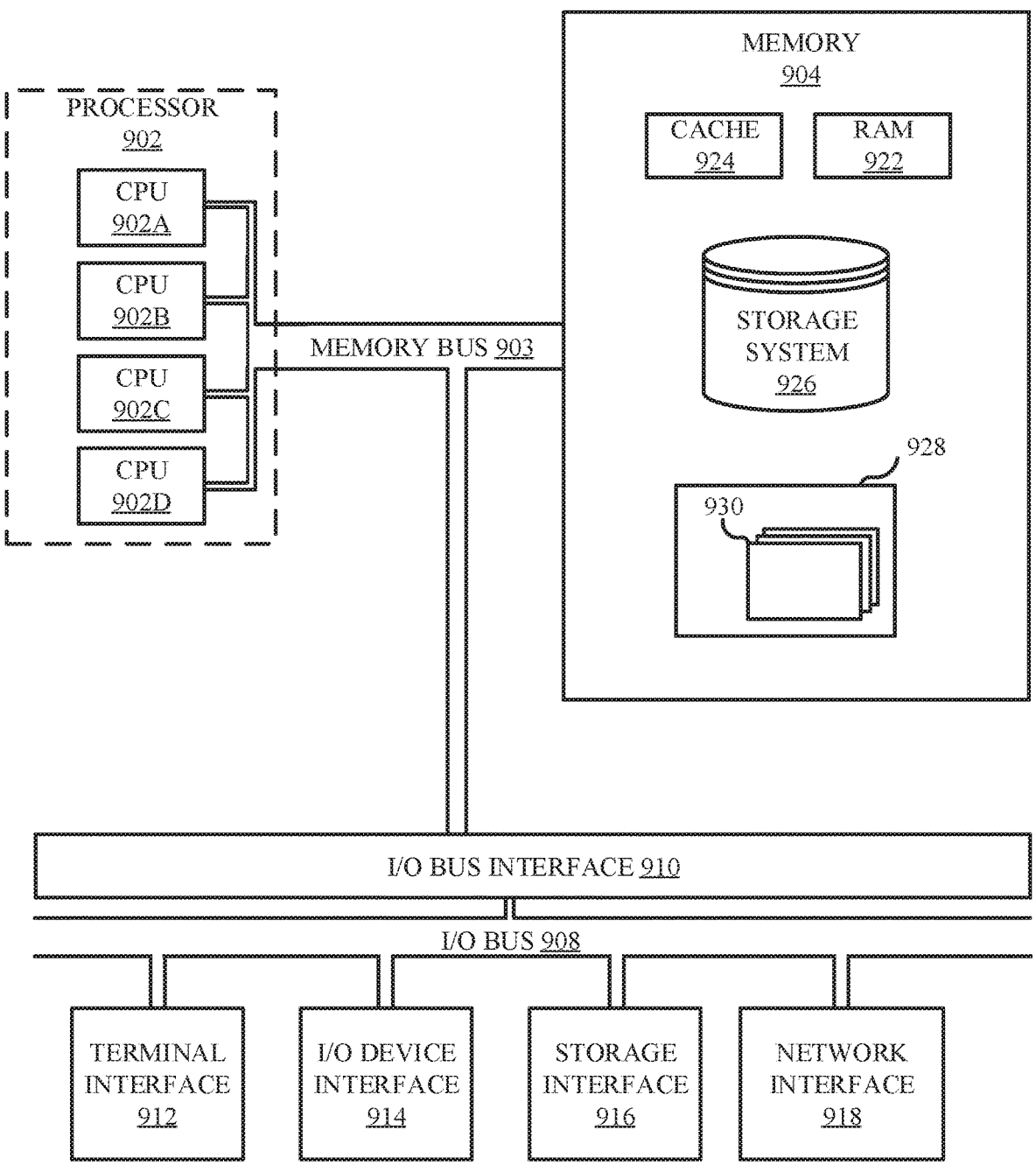
FIG. 9 illustrates a high-level block diagram of an example computer system that may be used in implementing one or more of the methods, tools, and modules, and any related functions, described herein, in accordance with embodiments of the present disclosure.

Referring now to FIG. 9, shown is a high-level block diagram of an example computer system 901 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 901 may comprise one or more CPUs 902, a memory subsystem 904, a terminal interface 912, a storage interface 916, an I/O (Input/Output) device interface 914, and a network interface 918, all of which may be communicatively coupled, directly or indirectly, for inter-component communication via a memory bus 903, an I/O bus 908, and an I/O bus interface unit 910.

The computer system 901 may contain one or more general-purpose programmable central processing units (CPUs) 902A, 902B, 902C, and 902D, herein generically referred to as the CPU 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may include one or more levels of on-board cache.

System memory 904 may include computer system readable media in the form of volatile memory, such as random access memory (RAM) 922 or cache memory 924. Computer system 901 may further include other removable/non-removable, volatile/non-volatile computer system storage media. By way of example only, storage system 926 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 904 can include flash memory, e.g., a flash memory stick drive or a flash drive. Memory devices can be connected to memory bus 903 by one or more data media interfaces. The memory 904 may include at least one program product having a set (e.g., at least one) of program modules that are configured to carry out the functions of various embodiments.

One or more programs/utilities 928, each having at least one set of program modules 930 may be stored in memory 904. The programs/utilities 928 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 930 generally perform the functions or methodologies of various embodiments.

Although the memory bus 903 is shown in FIG. 9 as a single bus structure providing a direct communication path among the CPUs 902, the memory subsystem 904, and the I/O bus interface 910, the memory bus 903 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 908 are shown as single respective units, the computer system 901 may, in some embodiments, contain multiple I/O bus interface units 910, multiple I/O buses 908, or both. Further, while multiple I/O interface units are shown, which separate the I/O bus 908 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface, but receives requests from other computer systems (clients). Further, in some embodiments, the computer system 901 may be implemented as a desktop computer, portable computer, laptop or notebook computer, tablet computer, pocket computer, telephone, smart phone, network switches or routers, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. Furthermore, multiple operations may occur at the same time or as an internal part of a larger process. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Figure 10:
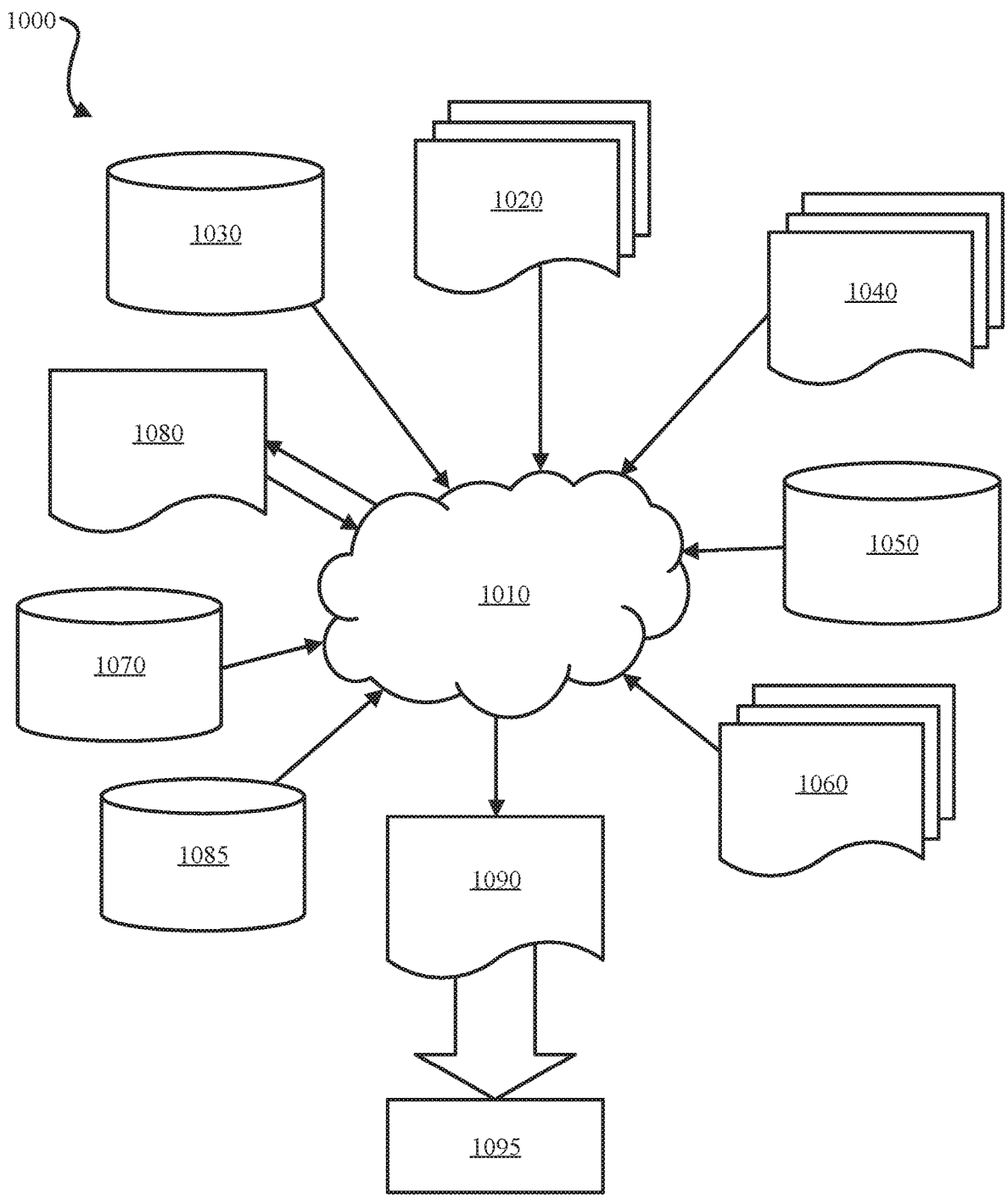
FIG. 10 illustrates a flow diagram of a design process used in semiconductor design, manufacture, and/or test, in accordance with embodiments of the present disclosure.

FIG. 10 shows a block diagram of an exemplary design flow 1000 used for example, in semiconductor IC logic design, simulation, test, layout, and manufacture. Design flow 1000 includes processes, machines, and/or mechanisms for processing design structures or devices to generate logically or otherwise functionally equivalent representations of the design structures and/or devices described above and shown in FIGS. 4, 5, and 7. The design structures processed and/or generated by design flow 1000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1000 may vary depending on the type of representation being designed. For example, a design flow 1000 for building an application specific IC (ASIC) may differ from a design flow 1000 for designing a standard component or from a design flow 1000 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 1020 that is preferably processed by a design process 1010. Design structure 1020 may be a logical simulation design structure generated and processed by design process 1010 to produce a logically equivalent functional representation of a hardware device. Design structure 1020 may also or alternatively comprise data and/or program instructions that when processed by design process 1010, generate a functional representation of the physical structure of a hardware device. Whether representing functional and/or structural design features, design structure 1020 may be generated using electronic computer-aided design (ECAD) such as implemented by a core developer/designer. When encoded on a machine-readable data transmission, gate array, or storage medium, design structure 1020 may be accessed and processed by one or more hardware and/or software modules within design process 1010 to simulate or otherwise functionally represent an electronic component, circuit, electronic or logic module, apparatus, device, or system such as those shown in FIGS. 4, 5, and 7. As such, design structure 1020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1010 preferably employs and incorporates hardware and/or software modules for synthesizing, translating, or otherwise processing a design/simulation functional equivalent of the components, circuits, devices, or logic structures shown in FIGS. 4, 5, and 7 to generate a Netlist 1080 which may contain design structures such as design structure 1020. Netlist 1080 may comprise, for example, compiled or otherwise processed data structures representing a list of wires, discrete components, logic gates, control circuits, I/O devices, models, etc. that describes the connections to other elements and circuits in an integrated circuit design. Netlist 1080 may be synthesized using an iterative process in which netlist 1080 is resynthesized one or more times depending on design specifications and parameters for the device. As with other design structure types described herein, netlist 1080 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1010 may include hardware and software modules for processing a variety of input data structure types including Netlist 1080. Such data structure types may reside, for example, within library elements 1030 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1040, characterization data 1050, verification data 1060, design rules 1070, and test data files 1085 which may include input test patterns, output test results, and other testing information. Design process 1010 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1010 without deviating from the scope and spirit of the invention. Design process 1010 may also include modules for performing standard circuit design processes such as timing analysis, verification, design rule checking, place and route operations, etc.

Design process 1010 employs and incorporates logic and physical design tools such as HDL compilers and simulation model build tools to process design structure 1020 together with some or all of the depicted supporting data structures along with any additional mechanical design or data (if applicable), to generate a second design structure 1090. Design structure 1090 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1020, design structure 1090 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 4, 5, and 7. In one embodiment, design structure 1090 may comprise a compiled, executable HDL simulation model that functionally simulates the devices shown in FIGS. 4, 5, and 7.

Design structure 1090 may also employ a data format used for the exchange of layout data of integrated circuits and/or symbolic data format (e.g. information stored in a GDSII (GDS2), GL1, OASIS, map files, or any other suitable format for storing such design data structures). Design structure 1090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 4, 5, and 7. Design structure 1090 may then proceed to a stage 1095 where, for example, design structure 1090: proceeds to tape-out, is released to manufacturing, is released to a mask house, is sent to another design house, is sent back to the customer, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
   detecting, by a secondary integrated circuit (IC), a noise signal on a shared plane of a printed circuit board (PCB) that includes the secondary IC;
   analyzing the noise signal to determine characteristics of the noise signal;
   generating a masking signal based on the characteristics; and
   injecting the masking signal onto the shared plane.

2. The method of claim 1, wherein analyzing the noise signal includes:
   converting the noise signal into a digital signal; and
   performing a Fourier transform on the digital signal to decompose the noise signal into its constituent components.

3. The method of claim 1, wherein the characteristics of the noise signal include a frequency of the noise signal, one or more amplitudes of the noise signal, and a rise and fall time of the noise signal.

4. The method of claim 3, wherein generating the masking signal comprises:
   generating a random bit pattern; and
   generating a digital masking signal that encodes the random bit pattern, wherein the digital masking signal has a similar frequency, amplitude, and rise and fall time as the noise signal.

5. The method of claim 4, wherein generating the masking signal further comprises:
   converting the digital masking signal into an analog signal using a digital to analog converter.

6. The method of claim 1, wherein the shared plane is selected from the group consisting of a power plane and a ground plane.

7. The method of claim 1, wherein:
   the PCB includes two or more shared planes,
   the detecting the noise signal on the shared plane includes detecting a first noise signal on a first shared plane and a second noise signal on a second shared plane, the first and second noise signals being different,
   the analyzing the noise signal includes determining a first set of characteristics of the first noise signal and a second set of characteristics of the second noise signal,
   generating the masking signal based on the characteristics includes generating a first masking signal based on the first set of characteristics and generating a second masking signal based onto the second set of characteristics, and
   injecting the masking signal onto the shared plane includes injecting the first masking signal on the first shared plane and injecting the second masking signal onto the second shared plane.

8. A system comprising:
   a printed circuit board (PCB) having one or more shared planes;
   a first integrated circuit (IC) embedded on the PCB and electrically coupled to the one or more shared planes, the first IC being configured to process sensitive data; and
   a second IC embedded on the PCB and electrically coupled to the one or more shared planes, wherein the second IC is configured to perform a method comprising:
   detecting a first noise signal, generated by the first IC, on a first shared plane of the one or more shared planes;
   analyzing the first noise signal to determine characteristics of the first noise signal;
   generating a first masking signal based on the characteristics of the first noise signal; and
   injecting the first masking signal onto the first shared plane.

9. The system of claim 8, wherein the second IC includes an analog to digital converter (ADC) and a digital signal processor (DSP), and wherein analyzing the first noise signal includes:
   converting the first noise signal into a digital signal using the ADC; and
   performing, by the DSP, a Fourier transform on the digital signal to decompose the first noise signal into its constituent components.

10. The system of claim 8, wherein the characteristics of the first noise signal include a frequency of the first noise signal, one or more amplitudes of the first noise signal, and a rise and fall time of the first noise signal.

11. The system of claim 10, wherein generating the first masking signal comprises:
    generating a random bit pattern; and
    generating a digital masking signal that encodes the random bit pattern, wherein the digital masking signal has a similar frequency, amplitude, and rise and fall time as the first noise signal.

12. The system of claim 11, wherein the second IC includes a digital to analog converter (DAC), and wherein generating the first masking signal further comprises:
    converting, using the DAC, the digital masking signal into an analog signal.

13. The system of claim 8, wherein the first shared plane is selected from the group consisting of a power plane and a ground plane.

14. The system of claim 8, wherein the one or more shared planes further includes a second shared plane, and wherein the method further comprises:
    detecting a second noise signal on the second shared plane, the second noise signal being different than the first noise signal;
    analyzing the second noise signal to determine a set of characteristics of the second noise signal,
    generating a second masking signal based onto the set of characteristics of the second noise signal, and
    injecting the second masking signal onto the second shared plane.

15. A computer program product comprising a computer readable storage medium having program instructions embodied therewith, the program instructions executable by processor to cause the processor to perform a method comprising:
    detecting a noise signal on a shared plane of a printed circuit board (PCB) that includes a first IC and a secondary IC;
    analyzing the noise signal to determine characteristics of the noise signal;
    generating a masking signal based on the characteristics; and
    injecting the masking signal onto the shared plane.

16. The computer program product of claim 15, wherein analyzing the noise signal includes:
    converting the noise signal into a digital signal; and
    performing a Fourier transform on the digital signal to decompose the noise signal into its constituent components.

17. The computer program product of claim 15, wherein the characteristics of the noise signal include a frequency of the noise signal, one or more amplitudes of the noise signal, and a rise and fall time of the noise signal.

18. The computer program product of claim 17, wherein generating the masking signal comprises:
   generating a random bit pattern; and
   generating a digital masking signal that encodes the random bit pattern, wherein the digital masking signal has a similar frequency, amplitude, and rise and fall time as the noise signal.

19. The computer program product of claim 18, wherein generating the masking signal further comprises:
   converting the digital masking signal into an analog signal using a digital to analog converter.

20. The computer program product of claim 15, wherein:
   the PCB includes two or more shared planes,
   the detecting the noise signal on the shared plane includes detecting a first noise signal on a first shared plane and a second noise signal on a second shared plane, the first and second noise signals being different,
   the analyzing the noise signal includes determining a first set of characteristics of the first noise signal and a second set of characteristics of the second noise signal,
   generating the masking signal based on the characteristics includes generating a first masking signal based on the first set of characteristics and generating a second masking signal based onto the second set of characteristics, and
   injecting the masking signal onto the shared plane includes injecting the first masking signal on the first shared plane and injecting the second masking signal onto the second shared plane.

* * * * *